United States Patent [19]

Murakami

[11] Patent Number: 5,034,845
[45] Date of Patent: Jul. 23, 1991

[54] INTEGRATED CIRCUIT APPARATUS INCLUDING STATIC ELECTRICITY PROTECTION CIRCUIT

[75] Inventor: Yukichi Murakami, Nara, Japan
[73] Assignee: Sharp Kabushiki Kaisha, Osaka, Japan
[21] Appl. No.: 424,332
[22] Filed: Oct. 19, 1989
[30] Foreign Application Priority Data
Oct. 21, 1988 [JP] Japan .................. 63-266430
[51] Int. Cl.⁵ .............................................. H02H 9/04
[52] U.S. Cl. ........................................ 361/56; 361/58; 361/111
[58] Field of Search ..................... 361/56, 58, 111, 91; 357/23.13

[56] References Cited
U.S. PATENT DOCUMENTS 4,736,271  4/1988  Mack et al. ........................... 361/91
4,868,705  9/1989  Shiochi et al. ....................... 361/91

Primary Examiner—Todd E. DeBoer

[57] ABSTRACT

An LSI includes two internal circuits connected to different power sources, and conventional static electricity protection circuits, provided for connecting input terminals of the internal circuit connected to one power source and for connecting output terminals of the other internal circuit connected to the other power source. The LSI further includes two static electricity protection circuits each having an enhancement type field effect N channel MOS transistor provided for connecting the power source and the other power source. Thus, a potential rise or a potential fall on one input/output terminal of the internal circuit connected to the power source, which has static electricity applied with respect to the other power source as a reference, is transmitted to one of the new static electricity protection circuits through the conventional static electricity protection circuits connected to the above input/output terminal. This transmission of the potential rise or fall then causes the enhancement type FET of this new static electricity protection circuit to be rendered conductive. Accordingly, a current path is established between the above input/output terminal and the other power source, so that the static electricity applied to the above input/output terminal is absorbed in the other power source.

11 Claims, 5 Drawing Sheets

INTEGRATED CIRCUIT APPARATUS INCLUDING STATIC ELECTRICITY PROTECTION CIRCUIT

BACKGROUND OF THE INVENTION

1. Field of the Invention

The present invention relates generally to static electricity protection circuits for protecting internal circuits of an integrated circuit apparatus such as an LSI from being damaged by static electricity and, more particularly, to static electricity protection circuits employed for an integrated circuit apparatus including internal circuits connected to a plurality of power sources.

2. Description of the Background Art

In such cases that a charged human body, a charged object or the like contacts a lead (an external terminal) of an integrated circuit apparatus such as an LSI and that a charged integrated circuit apparatus contacts a conductor, it is known that internal circuits of the integrated circuit apparatus are damaged by charge/discharge of the integrated circuit apparatus, which results from application of static electricity to the apparatus.

FIG. 1A is a diagram illustrating an input terminal and its vicinity in the LSI, which receives an input signal to be transmitted to an internal circuit via a predetermined lead. Referring to FIG. 1A, an input signal to the LSI 1 is in general applied to the gate of an MOS transistor Tr1 in the internal circuit 10 via the input terminal IN connected to the predetermined lead (not shown) and via a resistor 11. That is, the input terminal IN and the gate of the transistor Tr1 are connected via the resistor 11. Thus, static electricity applied to the lead connected to the input terminal IN is applied to the gate of the transistor Tr1 via the input terminal IN and the resistor 11.

FIG. 1B is a sectional view illustrating a general structure of an N channel MOS transistor formed in a P− substrate 100. Referring to this figure, a gate G of the MOS transistor is in general formed of an oxide film. The gate oxide film G of the MOS transistor has a breakdown voltage of ten to several tens V. Thus, as illustrated in FIG. 1A, when a high voltage higher than or equal to the above breakdown voltage is applied to the gate G of the transistor Tr1 due to the application of static electricity from the lead to the input terminal IN, a lower portion of the gate oxide film G (shown by the arrow in FIG. 1B) is destroyed.

FIG. 2A is a diagram illustrating an output terminal and its vicinity in the LSI, which provides an output signal from the internal circuit to a predetermined lead. Referring to this figure, the output signal from the internal circuit 10 is generally taken out from a connecting point of MOS transistors Tr2 and Tr3 of the internal circuit 10 and provided to the predetermined lead via a resistor 12 and an output terminal OUT. That is, the output terminal OUT is connected to the connecting point of the transistors Tr2 and Tr3 via the resistor 12. Therefore, static electricity applied to the lead connected to the output terminal OUT is applied to the connecting point of the transistors Tr2 and Tr3 in the internal circuit 10 via the output terminal OUT and the resistor 12.

FIG. 2B is a sectional view illustrating a structure of a portion in which two N channel MOS transistors formed on the P− substrate 100 are connected in series. Referring to this figure, the connecting point of the these two MOS transistors corresponds to an N+ diffusion layer region forming a source S (or a drain D) of one of the transistors and the source S (or the drain D) of the other transistor Tr3 in common. A breakdown voltage of an PN junction is generally ten to several tens V. Accordingly, when a high voltage higher than or equal to the above breakdown voltage is applied to the connecting point of the transistors Tr2 and Tr3 due to application of static electricity from the lead to the output terminal OUT, in FIG. 2A, a junction portion of the N+ region and the P− substrate 100 (shown by the arrow in FIG. 2B) is destroyed.

As described above, destruction of the internal circuit is possible due to the application of static electricity to the input/output terminal of the LSI via the lead. The magnitude of the static electricity applied to the integrated circuit apparatus is totally different depending on an environment in which the apparatus is used, but is in general in the order of several hundreds to several thousands V. Particularly, it is significantly possible that a considerably large magnitude of static electricity is applied to integrated circuit apparatuses employed for automobiles and IC cards. Thus, it is highly possible that the internal circuit of the integrated circuit apparatus employed in such an environment is destroyed by static electricity.

FIG. 3 is a model diagram illustrating a phenomenon where static electricity is applied to the lead of the integrated circuit apparatus such as LSI.

Referring to FIG. 3, with the charged human body or charged object regarded as a capacitor storing a certain amount of charges, a phenomenon that the charged human body or object contacts a certain lead L1, connected to an internal circuit 10 of the LSI 1 and serving to input/output a signal, is equivalent to the event that a charged capacitor C is connected between the lead L1 and the ground. For example, in the case that a positive charge is stored in the capacitor C, a high voltage +V of a positive polarity is applied to the internal circuit 10 of the LSI 1 via the leads L1. On the other hand, in the case that a negative charge is stored in the capacitor C, a high voltage −V of a negative polarity is similarly applied to the internal circuit 10 of the LSI via the lead L1.

Therefore, in order to prevent such static electricity from being directly applied to the internal circuit 10 of the LSI 1, a charge applied from the capacitor C to the lead L1 may be neutralized with a charge of opposite polarity thereto before being inputted to the internal circuit 10. Meanwhile, the same amount of charges with opposite polarities are induced in both plates of the charged capacitor C. Thus, in order to prevent the charge applied from one of the plates of the capacitor C to the lead L1 from being applied to the internal circuit 10, the lead L1 and the other plate of the capacitor C may electrically be connected to each other in application of static electricity so that the charge applied to the lead L1 may return to the other plate of the capacitor C through other paths than the input/output path of a signal in the internal circuit 10. In general, the other plate of the capacitor C, i.e., a reference potential terminal of an electrostatic source is a power source for driving the LSI 1. Therefore, in order to electrically connect the lead L1 to the other plate of the capacitor C, the lead L1 and a lead L2, which connects the LSI 1 to the power source, may electrically be connected to each other in the LSI 1. That is, by forming a closed loop which electrically connects both plates of the capacitor C (the electrostatic source) in the LSI 1, in application of static electricity, and then combining the static electricity applied to the LSI 1 with a charge of opposite polarity thereto at the lead L2 side (the above described power source), the inner circuit 10 can be protected from being applied by the static electricity.

Thus, static electricity protection circuit for forming the described closed loop is provided for each input-/output terminal, which is connected to the internal circuit for serving to input/output a signal in the integrated circuit apparatus such as an LSI, in order to prevent damage of the internal circuit due to the static electricity. Furthermore, the static electricity protection circuit, which is the same as the one provided in the LSI connected to one power source, is independently provided for each power source in the LSI connected to a plurality of power sources.

FIG. 4 is a diagram illustrating one example of an inner configuration of an LSI connected to two power sources, including conventional static electricity protection circuits.

Referring to FIG. 4, the LSI 1 includes internal circuits A and B. The internal circuit A is provided between a power source terminal $V_{CCA}$ and a ground terminal $GND_A$, connected respectively to a higher potential side and a lower potential side (which is a ground potential) of one of the power sources, and forms an appropriate current path $l_A$ connecting this power source terminal $V_{CCA}$ and the ground terminal $GND_A$. Similarly, the internal circuit B is provided between a power source terminal $V_{CCB}$ and a ground terminal $GND_B$, connected respectively to a higher potential side and a lower potential side (which is a ground potential) of the other power source, and forms an appropriate current path $l_B$ connecting this power source terminal $V_{CCB}$ and the ground terminal $GND_B$. In addition, the receiving/sending of a predetermined signal is only carried out between the internal circuits A and B. That is, the power source terminals $V_{CCA}$ and $V_{CCB}$, and the ground terminals $GND_A$ and $GND_B$ are electrically isolated from each other, respectively, and the current paths $l_A$ and $l_B$ in the respective internal circuits A and B are independent of each other. This electrical isolation of the different power sources is carried out in the case of different voltages of the power sources, or in order to prevent power source noise or GND noise, which occurs in one of a plurality of internal circuits connected to the different power sources from being propagated to the other internal circuit.

In operation, n (n=1, 2, 3 ...) input terminals $IN_1$-$IN_n$, which are externally supplied with a potential lower than the potential of the power source terminal $V_{CCA}$ but higher than the potential of the ground terminal $GND_A$ are connected respectively via static electricity protection circuits $EC_{A1}$-$EC_{An}$ to the internal circuit A. In operation, m (m=1, 2, 3 ...) output terminals $OUT_1$-$OUT_m$, which are supplied from the circuit B with a potential lower than the potential of the power source terminal $V_{CCB}$ but higher than the potential of the ground terminal $GND_B$ are connected respectively via static electricity protection circuits $EC_{B1}$-$EC_{Bm}$ to the internal circuit B.

Each static electricity protection circuit $EC_{Ai}$ (i represents an integer of 1 to n) includes a resistor $R_{Ai}$ provided between the input terminal $IN_i$ and the internal circuit A, a diode $D_{Ai1}$ provided between a terminal of the resistor $R_{Ai}$ at the internal circuit A side and the power source terminal $V_{CCA}$ to be reverse-biased, and a diode $D_{Ai2}$ provided between the terminal of the resistor $R_{Ai}$ at the internal circuit A side and the ground terminal $GND_A$ to be reverse-biased.

Similarly, each static electricity protection circuit $EC_{Bj}$ (the j represents an integer of 1 to m) includes a resistor $R_{Bj}$ provided between the output terminal $OUT_j$ and the internal circuit B, a diode $D_{Bj1}$ provided between a terminal of the resistor $R_{Bj}$ at the internal circuit B side and the power source terminal $V_{CCB}$ to be reverse-biased, and a diode $D_{Bj2}$ provided between the terminal of the resistor $R_{Bj}$ at the internal circuit B side and the ground terminal $GND_B$ to be reverse-biased.

A description will be given on the operation of the static electricity protection circuits $EC_{A1}$-$E_{An}$ and $EC_{B1}$-$EC_{Bm}$ with reference to FIG. 5. FIG. 5 is a model diagram illustrating a state that static electricity is applied to the LSI 1 illustrated in FIG. 4.

In the above LSI 1, when static electricity of a positive charge is applied to any input terminal $IN_i$ with respect to the power source terminal $V_{CCA}$ or the ground terminal $GND_A$ as a reference, the diode $DA_{i1}$ is forward-biased to be conductive in the static electricity protection circuit $EC_{Ai}$, and thus a current path from the input terminal $IN_i$ to the power source terminal $V_{CCA}$ is established by the resistor $R_{Ai}$ and the diode $D_{Ai1}$. Conversely, when static electricity of a negative charge is applied to any input terminal $IN_i$ with respect to the power source terminal $V_{CCA}$ or the ground terminal $GND_A$ as reference, the diode $D_{Ai2}$ is forward-biased to be conductive in the static electricity protection circuit $EC_{Ai}$, and thus a current path from the ground terminal $GND_A$ to the input terminal $IN_i$ is established by the resistor $R_{Ai}$ and the diode $D_{Ai2}$. As a result, even if static electricity is applied to the input terminal $IN_i$, a high voltage is not applied to a signal input portion in the internal circuit A (the gate of the transistor Tr1 in FIG. 1A) or to a signal output portion (the connecting point of the transistors Tr2 and Tr3 in FIG. 2A).

For example, in the case that a positive charge is applied to the input terminal $IN_1$ with respect to the power source terminal $V_{CCA}$ as a reference, i.e., the case that a capacitor C1 storing a positive charge $+V$ is connected between the power source terminal $V_{CCA}$ and the input terminal $IN_1$ as illustrated in FIG. 5, the diode $D_{A11}$ becomes conductive. The positive charge applied to the input terminal $IN_1$ is then applied via the resistor $R_{A1}$ and the diode $D_{A11}$ to the power source terminal $V_{CCA}$, connected to the reference potential side of the electrostatic source, at which the same amount of a negative charge $-V$ as the positive charge is induced. The applied positive charge then combines with the negative charge $-V$ at the power source terminal $V_{CCA}$. That is, the positive charge applied to the input terminal $IN_1$ seems to be absorbed in the static electricity protection circuit $EC_{A1}$.

Conversely, where a negative charge is applied to the input terminal $IN_1$ with respect to the power source terminal $V_{CCA}$ as a reference, the diode $D_{A12}$ becomes conductive. Thus the applied negative charge is applied via the resistor $R_{A1}$. The diode $D_{A12}$ and the current path $l_A$ in the internal circuit A to the power source terminal $V_{CCA}$, which is the reference potential terminal of the electrostatic source, and then combines with a charge of the opposite polarity therein. Therefore, the positive and negative charges applied to the input terminal IN are absorbed in the power source $V_{CCA}$ or the ground terminal $GND_A$, but not applied to the internal circuit A. Also where static electricity is applied to the input terminal $IN_1$ with respect to the ground terminal $GND_A$ as a reference, the applied static electricity is removed in the same manner as in the above case. That is, the static electricity protection circuit $EC_{Ai}$ protects the inner circuit A against the static electricity applied to the input terminal $IN_i$.

Similarly, with application of a positive charge to any output terminal $OUT_j$ with respect to the power source terminal $V_{CCB}$ or the ground terminal $GND_B$ as a reference, the diode $D_{Bj1}$ is forward-biased to be conductive in the static electricity protection circuit $EC_{Bj}$, and thus a current path from the output terminal $OUT_j$ to the power source terminal $V_{CCB}$ is established by the resistor $R_{Bj}$ and the diode $D_{Bj1}$. Conversely, where a negative charge is applied to any output terminal $OUT_j$ with respect to the power source terminal $V_{CCB}$ or the ground terminal $GND_B$ as a reference, the diode $D_{Bj2}$ is forward-biased to be conductive in the static electricity protection circuit $EC_{Bj}$, and thus a current path from the ground terminal $GND_B$ to the output terminal $OUT_j$ is established by the resistor $R_{Bj}$ and the diode $D_{Bj2}$. Therefore, the positive and negative charges applied to the output terminal $OUT_j$ are absorbed in the power source terminal $V_{CCB}$ or the ground terminal $GND_B$, but not applied to the internal circuit B. That is, the static electricity protection circuit $EC_{Bj}$ protects the inner circuit against the static electricity applied to the output terminal $OUT_j$.

However, the static electricity protection circuit $EC_{Ai}$ or $EC_{Bj}$, which is of the same configuration as the static electricity protection circuit provided in the LSI connected to one power source, is independently provided for each power source. Accordingly, with employment of such a conventional static electricity protection circuit for the LSI connected to the plurality of power sources, the plural power sources are electrically isolated from one another, so that it is difficult to protect all the inner circuits against the applied static electricity with respect to the power source terminals and the ground terminals connected to the respective power sources as references.

Namely, referring to FIG. 5, in case that static electricity is applied to any input terminal $IN_i$ with respect to the power source terminal $V_{CCB}$ or the ground terminal $GND_B$ of the internal circuit B as a reference, even if one of the diodes $D_{Ai1}$ and $D_{Ai2}$ is conductive in the protection circuit $EC_{Ai}$, no current path is established from the input terminal $IN_i$ to either the power source terminal $V_{CCB}$ or the ground terminal $GND_B$, being the reference potential terminal of the electrostatic source. The static electricity applied to the input terminal $IN_i$ is not combined but directly applied to the internal circuit A. That is, the internal circuit A cannot be protected against the static electricity.

For example, where a positive charge is applied to the input terminal $IN_1$ with respect to the power source terminal $V_{CCB}$ as a reference, i e., where a capacitor C2 for storing a positive charge $+V$ is connected between the input terminal $IN_1$ and the power source terminal $V_{CCB}$, the diode $D_{A11}$ becomes conductive, and thus the positive charge $+V$ applied to the input terminal $IN_1$ is applied to the power source terminal $V_{CCA}$ and to the ground terminal $GND_A$ via the current path $l_A$ in the internal circuit A. However, the applied positive charge is not removed but directly applied to the internal circuit A because a charge of the opposite polarity, which can be completely combined with the positive charge, does not exist at the power source terminal $V_{CCA}$ or at the ground terminal $GND_A$.

On the other hand, where static electricity is applied to any output terminal $OUT_j$ with respect to the power source terminal $V_{CCA}$ or the ground terminal $GND_A$ of the internal circuit A as a reference, even if either the diode $D_{Bj1}$ or $D_{Bj2}$ becomes conductive, no current path is established from the output terminal $OUT_j$ to the power source terminal $V_{CCA}$ or to the ground terminal $GND_A$. Therefore, the static electricity applied to the output terminal $OUT_j$ is applied to the internal circuit B directly. That is, the internal circuit B cannot be protected against the static electricity.

As described above, where static electricity is applied to the input terminal $IN_i$ or the output terminal $OUT_j$ with respect to a different power source from the one connected to the input/output terminal as a reference, no current path is established between the input/output terminal and the reference potential terminal of the electrostatic source, so that the applied static electricity is not absorbed in either the static electricity protection circuit $EC_{Ai}$ or $EC_{Bj}$. Therefore, the internal circuit A or B is in danger of being damaged in the above case.

SUMMARY OF THE INVENTION

It is an object of the present invention to provide an integrated circuit apparatus comprising a static electricity protection circuit capable of reliably protecting an internal circuit of the apparatus against static electricity.

It is another object of the present invention to provide an integrated circuit apparatus comprising a static electricity protection circuit capable of protecting respectively a plurality of internal circuits connected respectively to a plurality of power sources against static electricity with respect to any one of the plurality of power sources as a reference.

For accomplishing the above described objects, the integrated circuit apparatus according to the present invention comprises: at least first and second internal circuits driven independently by at least first and second power sources; first and second input/output terminals provided respectively for the first and second internal circuits; first static electricity removing means provided between the first input/output terminal and the first power source for electrically connecting the first input/output terminal, which has static electricity applied with respect to the first power source as a reference, to the first power source to remove the applied static electricity; second static electricity removing means provided between the second input/output terminal and the second power source for electrically connecting the second input/output terminal, which has static electricity applied with respect to the second power source as a reference, to the second power source to remove the applied static electricity; and third static electricity removing means provided between the first power source and the second power source for electrically connecting the first power source and the second power source when static electricity is applied to the first input/output terminal with respect to the second power source as a reference or when static electricity is applied to the second input/output terminal with respect to the first power source as a reference, to remove the applied static electricity.

The integrated circuit apparatus according to the present invention, configured in the above manner, comprises the third static electricity removing means connected between the first and second power sources, as well as the first and second static electricity removing means connected respectively to the first and second power sources for the first and second internal circuits and provided corresponding to the respective input/output terminals of the first and second internal circuits. Therefore, where a static electricity is applied to the input/output terminals of the first and second internal circuits with respect to the corresponding power sources as references, the internal circuits are protected by the first or second static electricity protecting means provided corresponding to the input/output, terminals, to which the static electricity is applied. Where static electricity is applied to the input/output terminals of the first and second internal circuits with respect to different power sources from the corresponding power sources as references, the third static electricity removing means removes the applied static electricity to protect the first and second internal circuits against the static electricity with respect to the different power sources from the corresponding power sources as references.

According to a preferred embodiment, the first static electricity removing means including two diode means connected between the first input/output terminal and the first power source to be reverse-biased, and the second static electricity removing means including two diode means connected between the second input/output terminal and the second power source to be reverse-biased, both have the same configuration as that of a conventional static electricity protection circuit. The third static electricity removing means comprises: a first static electricity removing path, which is provided between a higher potential side of the first power source and that of the second power source, and when positive static electricity is applied to the first input/output terminal with respect to the second power source as a reference or when positive static electricity is applied to the second input/output terminal with respect to the first power source as a reference, the higher potential side of the first power source and that of the second power source are electrically connected to remove the applied positive static electricity; and a second static electricity removing path, which is provided between a lower potential side of the first power source and that of the second power source, and when negative static electricity is applied to the first input/output terminal with respect to the second power source as a reference or when negative static electricity is applied to the second input/output terminal with respect to the first power source as a reference, the lower potential side of the first power source and that of the second power source are electrically connected to remove the applied negative static electricity.

According to the preferred embodiment, the first static electricity removing path comprises an enhancement type field effect transistor including a control terminal and a first conduction terminal, connected to the higher potential side of the first power source, and a second conduction terminal connected to the higher potential side of the second power source; and similarly, the second static electricity removing path comprises an enhancement type field effect transistor including a first conduction terminal and a control terminal, connected to the lower potential side of the first power source, and a second conduction terminal connected to the lower potential side of the second power source. These two field effect transistors may be of the same conductivity type, i.e., N type or P type. According to this preferred embodiment, as for any two of the plurality of power sources, the respective first conduction terminals of the first and second enhancement type field effect transistors are connected to one of the power sources, while the respective second conduction terminals of those transistors are connected to the other power source. Accordingly, in the case that static electricity is applied to the input/output terminal of the inner circuit connected to each power source with respect to the other power source as a reference, either the first or second field effect transistor becomes conductive due to punch through or a rise (or a fall) of a gate potential compared with a source potential, so that the static electricity applied to the input/output terminal is absorbed in the other power source.

In one aspect, the integrated circuit apparatus according to the present invention comprises: first and second internal circuits respectively provided corresponding to first and second power sources which are different from each other; a first higher potential side terminal and a first lower potential side terminal, for connecting the first power source to the first internal circuit; a second higher potential side terminal and a second lower potential side terminal, for connecting the second power source to the second internal circuit; a plurality of input terminals connected to the first internal circuit to receive an input signal to the first internal circuit; a plurality of output terminals connected to the second internal circuit to receive an output signal from the second internal circuit; a diode connected between each of the plurality of input terminals and the first higher potential side terminal; a diode connected between each of the plurality of input terminals and the first lower potential side terminal; a diode connected between each of the plurality of output terminals and the second higher potential side terminal; a diode connected between each of the plurality of output terminals and the second lower potential side terminal; a first N channel MOS transistor having its gate and drain connected to the first higher potential side terminal and its source connected to the second higher potential side terminal; and a second N channel MOS transistor having its gate and drain connected to the first lower potential side terminal and its source connected to the second lower potential side terminal. The first and second N channel MOS transistors are of enhancement type, and the first lower potential side terminal is coupled to a ground potential of the first power source, while the second lower potential side terminal is coupled to the second power source.

In the integrated circuit apparatus according to the present invention, it is possible to completely protect the internal circuits connected to the respective power sources against static electricity with respect to any of the power sources as a reference.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described in detail with reference to FIG. 6.

Figure 1A:
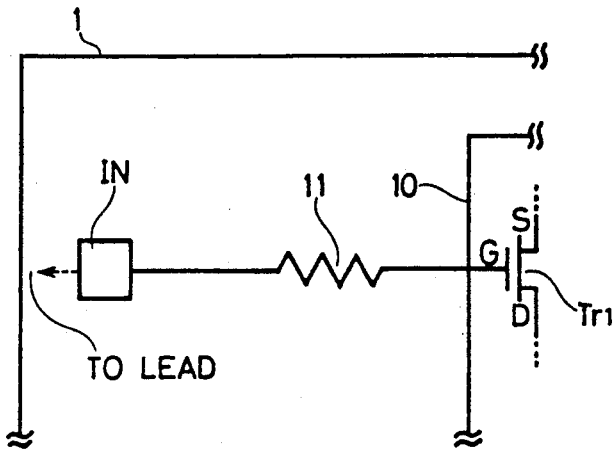
FIGS. 1A and 1B and FIGS. 2A and 2B are diagrams for describing a phenomenon that an internal circuit of an integrated circuit apparatus is destroyed by static electricity.
Figure 1B:
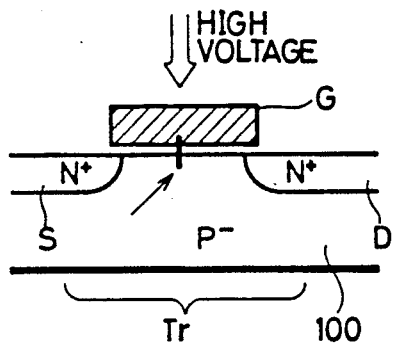
Figure 2A:
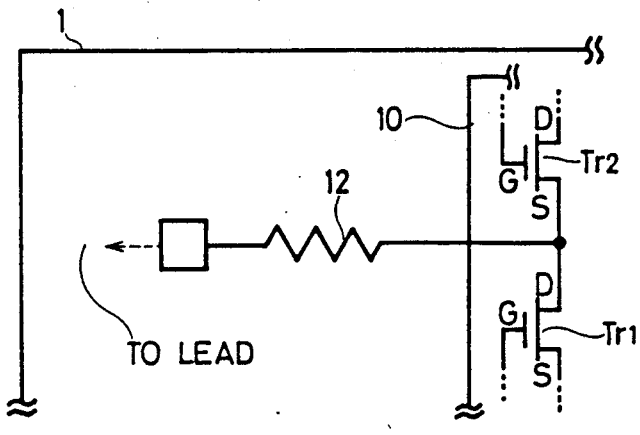
Figure 2B:
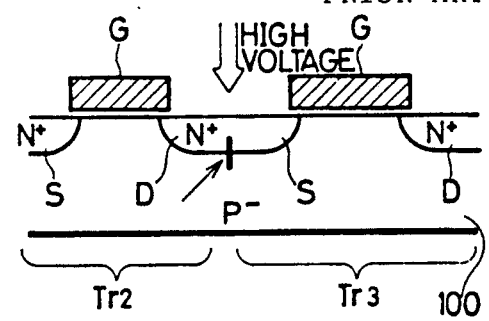
Figure 3:
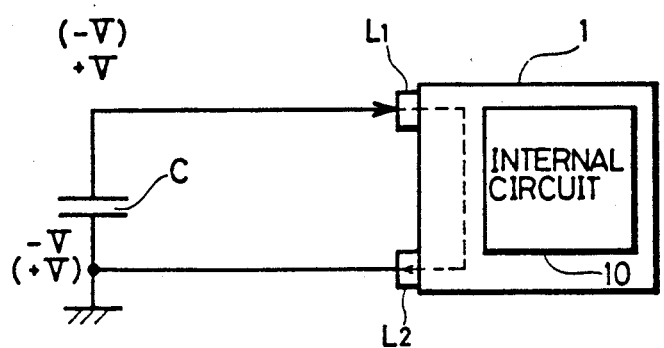
FIG. 3 is a diagram illustrating a principle that a conventional static electricity protecting circuit protects an internal circuit of an integrated circuit apparatus against a static electricity.
Figure 4:
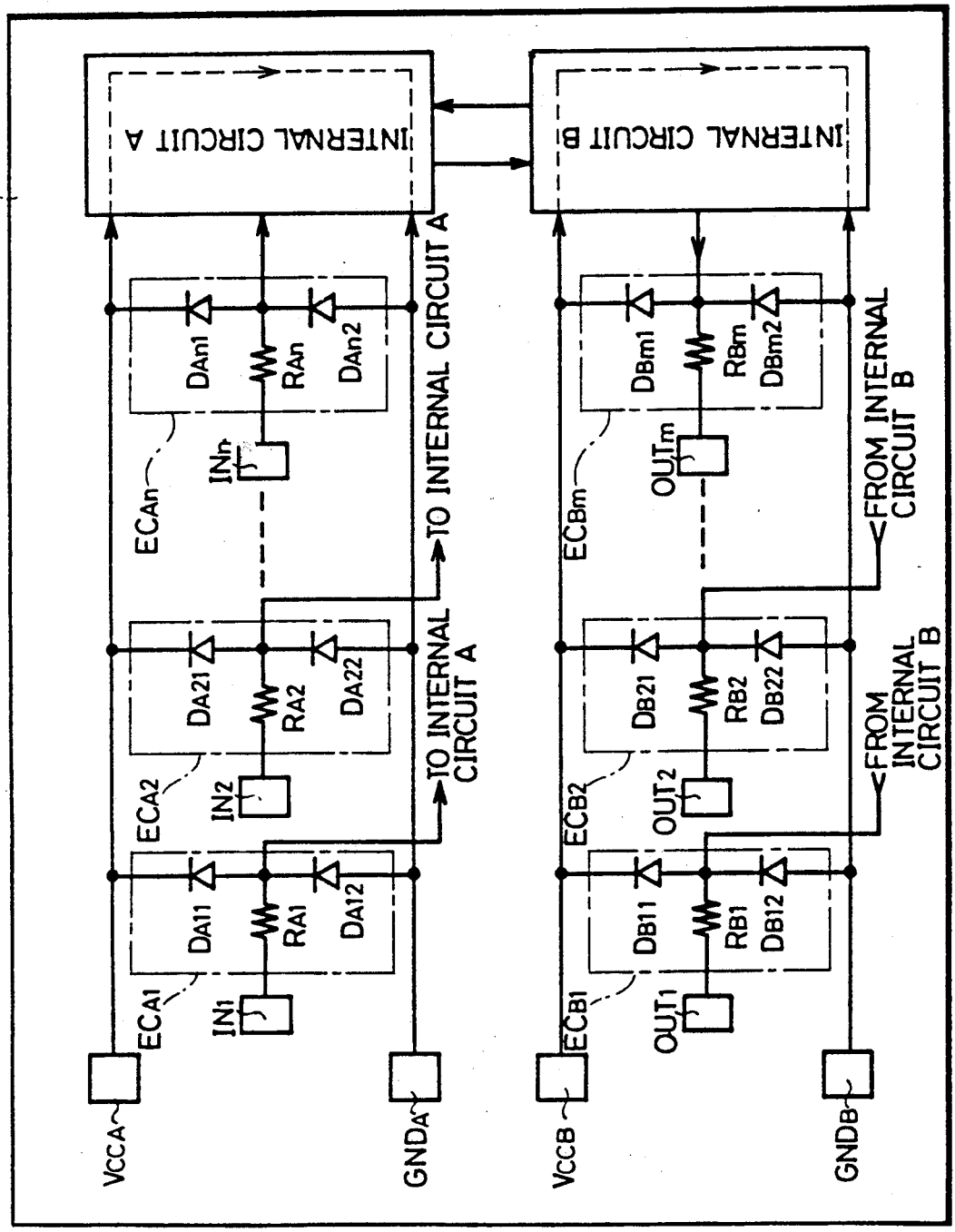
FIG. 4 is a diagram of an inner configuration of a conventional integrated circuit apparatus, illustrating the configuration of the conventional static electricity protecting circuit.
Figure 5:
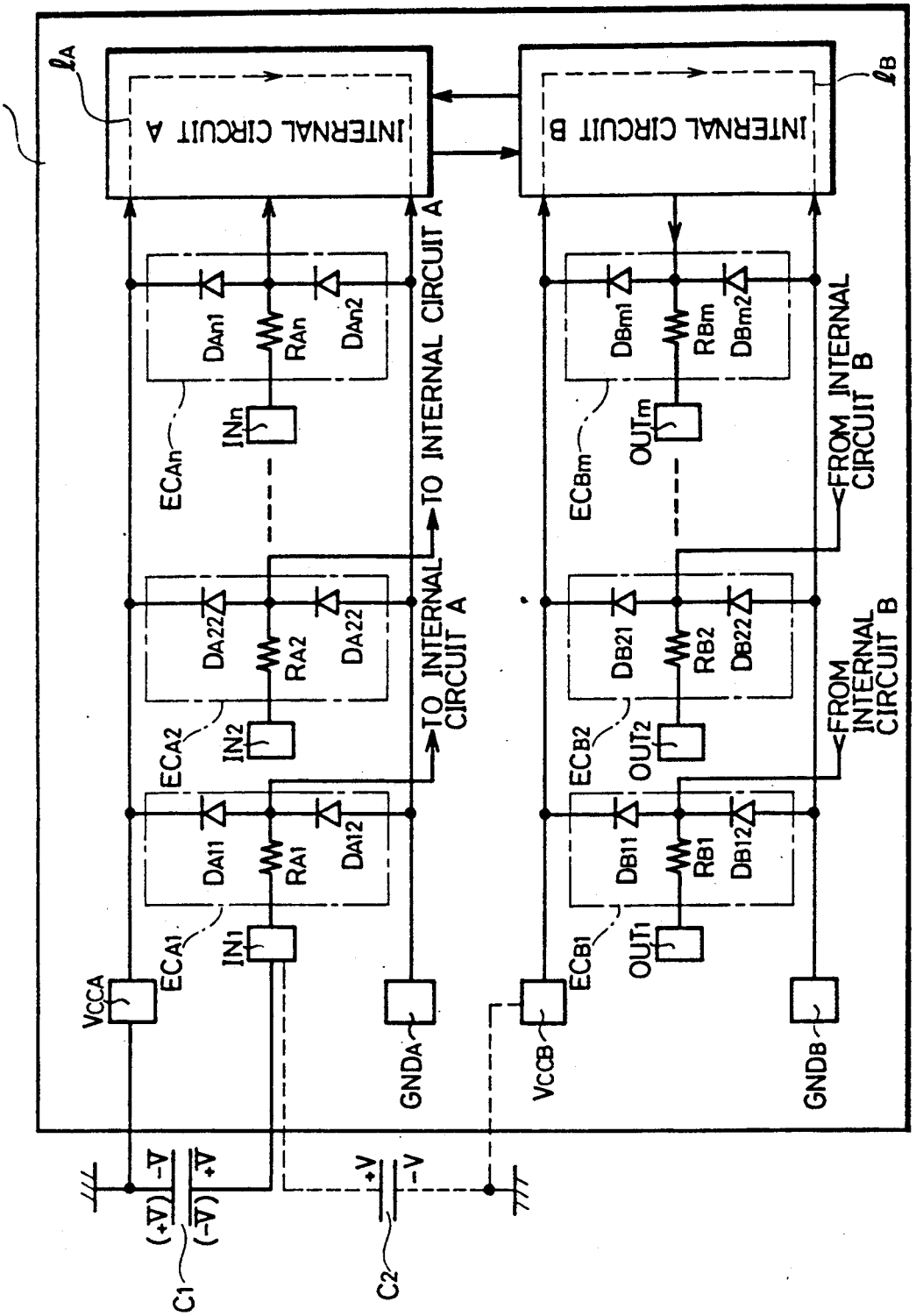
FIG. 5 is a model diagram illustrating a phenomenon that static electricity is applied to the integrated circuit apparatus illustrated in FIG. 4.
Figure 6:
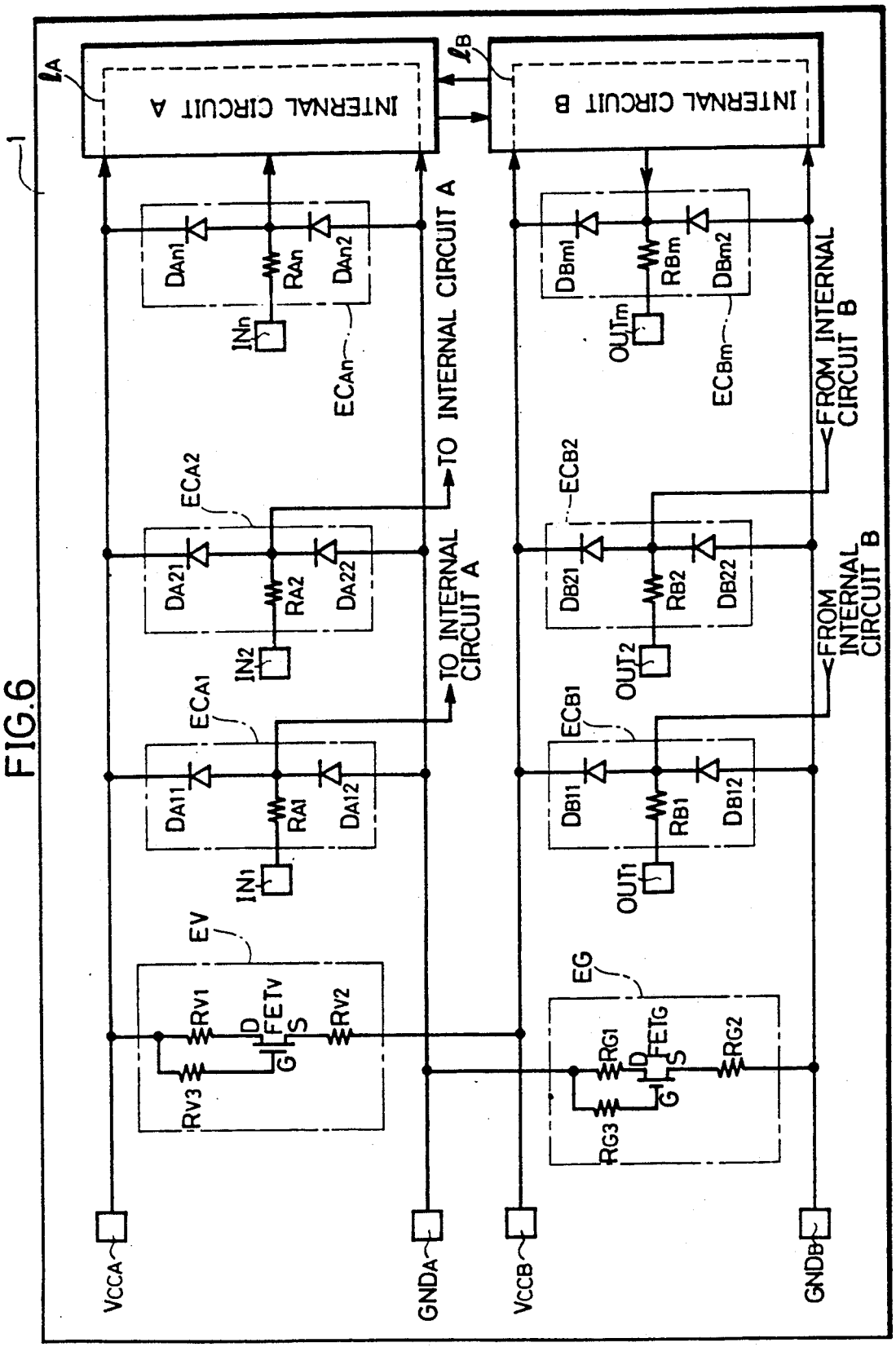
FIG. 6 is a diagram of an inner configuration of an integrated circuit apparatus according to one embodiment of the present invention.

FIG. 6, which illustrates one embodiment of the present invention, is a circuit diagram illustrating one example of the configuration of a static electricity protection circuit employed for the LSI connected to two power sources. To facilitate the description, elements in FIG. 6, having the same functions as those of the conventional example illustrated in FIGS. 4 and 5, are denoted with the same symbols as those of the elements illustrated in FIGS. 4 and 5.

Referring to FIG. 6, an LSI 1 includes two internal circuits A and B. The internal circuit A is provided between a power source terminal $V_{CCA}$ and a ground terminal $GND_A$, connected respectively to a higher potential side and a lower potential (a ground potential) side of one of the power sources, and includes an appropriate current path $l_A$ connecting the power source terminal $V_{CCA}$ and the ground terminal $GND_A$. Similarly, the internal circuit B is provided between a power source terminal $V_{CCB}$ and a ground terminal $GND_B$, connected respectively to a higher potential side and a lower potential (a ground potential) side of the other power source, and includes an appropriate current path $l_B$ connecting the power source terminal $V_{CCB}$ and the ground terminal $GND_B$. Sending/receiving of a signal is only carried out between the internal circuits A and B. Thus, as conventional, the power source terminals $V_{CCA}$ and $V_{CCB}$, and the ground terminals $GND_A$ and $GND_B$ are electrically isolated respectively from each other, and thus the current paths $l_A$ and $l_B$ are independent of each other.

In operation, as is conventional, n input terminals $IN_1-IN_n$, which are externally supplied with a potential lower than the potential of the power source terminal $V_{CCA}$ but higher than the potential of the ground terminal $GND_A$, are connected respectively via static electricity protection circuits $EC_{A1}-EC_{An}$ to the inner circuit A, for protecting the inner circuit A against static electricity with respect to only the power source connected to the internal circuit A as a reference. In operation, as is conventional, m output terminals $OUT_1-OUT_m$, which are supplied with a potential lower than the potential of the power source terminal $V_{CCB}$ but higher than the potential of the ground terminal $GND_B$, are connected respectively via static electricity protection circuits $EC_{B1}-EC_{Bm}$ to the inner circuit B, for protecting the inner circuit B against a static electricity with respect to only the power source connected to the inner circuit B as a reference.

Each static electricity protection circuit $EC_{Ai}$ includes, as is conventional, a resistor $R_{Ai}$ provided between the input terminal $IN_i$ and the internal circuit A, a diode $D_{Ai1}$ provided between a terminal of the resistor $R_{Ai}$ at the internal circuit A side and the power source terminal $V_{CCA}$ to be reverse-biased, and a diode $D_{Ai2}$ provided between the terminal of the resistor $R_{Ai}$ at the internal circuit A side and the ground terminal $GND_A$ to be reverse-biased.

Similarly, each static electricity protection circuit $EC_{Bj}$ includes a resistor $R_{Bj}$ provided between the output terminal $OUT_j$ and the internal circuit B, a diode $D_{Bj1}$ provided between a terminal of the resistor $R_{Bj}$ at the internal circuit B side and the power source terminal $V_{CCB}$ to be reverse-biased, and a diode $D_{Bj2}$ provided between the terminal of the resistor $R_{Bj}$ at the internal circuit B side and the ground terminal $GND_B$ to be reverse-biased.

Thus, a signal externally inputted to the input terminal $IN_i$ is transmitted via the resistor $R_{Ai}$ in the static electricity protection circuit $EC_{Ai}$ to the internal circuit A, and the output terminal $OUT_j$ receives an output signal of the internal circuit B via the resistor $R_{Bj}$ in the static electricity protection circuit $EC_{Bj}$ to output the same.

A static electricity protection circuit EV is connected between the power source terminals $V_{CCA}$ and $V_{CCB}$. This static electricity protection circuit EV includes an enhancement type field effect N channel MOS (Metal Oxide Semiconductor) transistor $FET_V$ and three resistors $R_{V1}$, $R_{V2}$ and $R_{V3}$. The transistor $FET_V$ has its drain D and its gate G connected to the power source terminal $V_{CCA}$ via the respective resistors $R_{V1}$ and $R_{V3}$. The transistor $FET_V$ has its source S connected to the power source terminal $V_{CCB}$ via the resistor $R_{V2}$. Resistance values of the resistors $R_{V1}-R_{V3}$ are set so that the potential of the gate G of the transistor $FET_V$ may not be higher than the potential of the source S by a threshold voltage $V_{Th-H}$ or more in the normal time that predetermined potentials are applied to the power source terminals $V_{CCA}$ and $V_{CCB}$ and to the ground terminals $GND_A$ and $GND_B$, and static electricity is applied to neither the input terminal $IN_i$ nor the output terminal $OUT_j$.

A static electricity protection circuit EG is connected between the ground terminals $GND_A$ and $GND_B$. This static electricity protection circuit EG also includes an enhancement type field effect N channel MOS transistor $FET_G$ and three resistors $R_{G1}$, $R_{G2}$ and $R_{G3}$. The transistor $FET_G$ has its drain D and its gate G connected to the ground terminal $GND_A$ via the respective resistors $R_{G1}$ and $R_{G3}$. The transistor $FET_G$ has its source S connected to the ground terminal $GND_B$ via the resistor $R_{G2}$. Resistance values of the resistors $R_{G1}-R_{G3}$ are set so that the potential of the gate G of the transistor $FET_G$ is not higher than the potential of the source S by a threshold voltage $V_{TH}$ or more in the normal time that predetermined potentials are applied to the power source terminals $V_{CCA}$ and $V_{CCB}$ and to the ground terminals $GND_A$ and $GND_B$, and a static electricity is applied to neither the input terminal $IN_i$ nor the output terminal $OUT_j$.

As described above, the power source terminals $V_{CCA}$ and $V_{CCB}$ are connected to each other via the static electricity protection circuit EV, and the ground terminals $GND_A$ and $GND_B$ are connected to each other via the static electricity protection circuit EG. However, the transistors $FET_V$ and $FET_G$ in the respective static electricity protection circuits EV and EG are both non-conductive in the normal time. Accordingly, the power source terminals $V_{CCA}$ and $V_{CCB}$, and the ground terminals $GND_A$ and $GND_B$ are electrically insulated respectively from each other in the normal time. Therefore, as in the conventional example that the static electricity protection circuits EV and EG are not provided, power source noise or GND noise which occurs in one of the internal circuits A and B is not propagated to the other internal circuit.

A description will be given on an operation of the static electricity protection circuits of the above configuration in application of static electricity.

When static electricity is applied to one of the input terminals $IN_i$ with respect to the power source terminal $V_{CCA}$ or the ground terminal $GND_A$ as a reference, the static electricity protection circuit $EC_{Ai}$ operates in the conventional manner. That is, with the static electricity of a positive polarity applied, the diode $D_{Ai1}$ becomes conductive, and thus a current path is established between the input terminal $IN_i$ and the power source terminal $V_{CCA}$ by the resistor $R_{Ai}$ and the diode $D_{Ai1}$. Meanwhile, with the static electricity of a negative polarity applied, the diode $D_{Ai2}$ becomes conductive, and thus a current path is established between the input terminal $IN_i$ and the ground terminal $GND_A$ by the resistor $R_{Ai}$ and the diode $D_{Ai2}$. Therefore, the static electricity protection circuit $EC_{Ai}$ protects, as is conventional, the inner circuit A against the static electricity applied to the input terminal $IN_i$ with respect to the power source of the internal circuit A as a reference.

Furthermore, when static electricity is applied to any output terminal $OUT_j$ with respect to the power source terminal $V_{CCB}$ or the ground terminal $GND_B$ as a reference, the static electricity protection circuit $EC_{Bj}$ operates as in the conventional manner. That is, with the static electricity of a positive polarity applied, the diode $D_{Bj1}$ becomes conductive, so that a current path is established between the output terminal $OUT_j$ and the power source terminal $V_{CCB}$ by the resistor $R_{Bj}$ and the diode $D_{Bj1}$. Meanwhile, with the static electricity of a negative polarity applied, the diode $D_{Bj2}$ becomes conductive, so that a current path is established between the output terminal $OUT_j$ and the ground terminal $GND_B$ by the resistor $R_{Bj}$ and the diode $D_{Bj2}$. Therefore, the static electricity protection circuit $EC_{Bj}$ also protects the internal circuit B against the static electricity applied to the output terminal $OUT_j$ with respect to the power source of the inner circuit B as a reference, as is conventional.

A description will be given on the case that static electricity is applied to any input terminal $IN_i$ connected to the internal circuit A with respect to the power source of the inner internal circuit B as a reference.

When static electricity of a positive charge is applied to any terminal $IN_i$ with respect to the power source terminal $V_{CCB}$ or the ground terminal $GND_B$ of the internal circuit B as a reference, the diode $D_{Ai1}$ is forward-biased in the conventional static electricity protection circuit $EC_{Ai}$. Accordingly, the input terminal $IN_i$ is electrically connected to the protection circuit EV via the resistor $R_{Ai}$ and the diode $D_{Ai1}$. Thus, a potential rise on the input terminal $IN_i$ due to the applied positive charge, which is not absorbed in the static electricity protection circuit $EC_{Ai}$, is transmitted to the drain D and the gate G of the transistor $FET_V$ via the respective resistors $R_{V1}$ and $R_{V3}$ of the protection circuit EV. As a result, potentials on the drain D and the gate G of the transistor $FET_V$ rise.

In general, a threshold voltage of the enhancement type FET is about several tenths of a V to IV, so that the potential rise on the gate G of the transistor $FET_V$ due to the static electricity causes a voltage between the gate G and the source S of the $FET_V$ to exceed the threshold voltage $V_{TH}$ and thus renders the transistor $FET_V$ conductive. Consequently, a current path is established between the input terminal $IN_i$ and the power source terminal $V_{CCB}$ by the resistor $R_{Ai}$ and the diode $D_{Ai1}$ in the static electricity protection circuit $EC_{Ai}$ and by the resistor $R_{V1}$, the transistor $FET_V$ and the resister $R_{V2}$ in the static electricity protection circuit EV. Therefore, the positive charge, applied to the input terminal $IN_i$ with respect to the power source terminal $V_{CCB}$ or the ground terminal $GND_B$ as a reference, is not applied directly to the internal circuit A because this applied positive charge combines with a charge of the opposite polarity, at the ground terminal $GND_B$, which is a reference potential terminal of an electrostatic source, through the static electricity protection circuit EV and the current path $I_B$ in the internal circuit B, or at the power source terminal $V_{CCB}$, which is the reference potential terminal of the electrostatic source, via the static electricity protection circuit EV.

Where static electricity of a negative charge is applied to any input terminal $IN_i$ with respect to the power source terminal $V_{CCB}$ or the ground terminal $GND_B$ of the internal circuit B as a reference, the diode $D_{Ai2}$ is forward-biased in the conventional static electricity protection circuit $EC_{Ai}$. Accordingly, the input terminal $IN_i$ is electrically connected to the protection circuit EG via the resistor $R_{Ai}$ and the diode $D_{Ai2}$, so that a potential fall on the input terminal $IN_i$ due to the applied negative charge, which is not absorbed in the static electricity protection circuit $EC_{Ai}$, is transmitted to the drain D and the gate S of the transistor $FET_G$ via the respective resistors $R_{G1}$ and $R_{G3}$ in the static electricity protection circuit EG, resulting in a potential fall on the drain D and the gate S of the transistor $FET_G$. Thus, a depletion layer in the vicinity of a drain region extends to a source region and then is connected to a depletion layer in the vicinity of the source region, in the transistor $FET_G$. That is, a current path due to the depletion layer is established between the drain D and the source S of the $FET_G$; namely, a punch through occurs, so that a transistor $FET_G$ is rendered conductive. As a result, a current path is established between the input terminal $IN_i$ and the ground terminal $GND_b$ by the resistor $R_{G2}$, the transistor $FET_G$ and the resistor $R_{G1}$ in the static electricity protection circuit EG and the diode $D_{Ai2}$ and the resistor $R_{Ai}$ in the static electricity protection circuit $EC_{Ai}$.

In general, the enhancement type FET causes a punch through with a reverse voltage of ten V to several tens V or more applied across the source and the gate, so that the punch through occurs sufficiently in the transistor $FET_G$ due to a potential rise on the drain and the source, resulting from application of static electricity. Therefore, the negative charge, applied to the input terminal $IN_i$ with respect to the power source terminal $V_{CCB}$ or the ground terminal $GND_B$ as a reference, is not directly applied to the internal circuit B since this applied negative charge combines with a charge of the opposite polarity at the power source terminal $V_{CCB}$ through the static electricity protection circuit EG and the current path $l_b$ in the internal circuit B, or at the ground terminal $GND_B$ through the static electricity protection circuit EG.

As described above, where the static electricity is applied to the input terminal $IN_i$ of the internal circuit A with respect to the power source of the internal circuit B as a reference, in contrast to the conventional example, the input terminal $IN_i$ is electrically connected to the power source of the internal circuit B via one of the static electricity protection circuits EV and EG. Thus, the static electricity applied to the input terminal $IN_i$ is removed at the ground terminal $GND_B$ or the power source terminal $V_{CCB}$, which is the reference potential terminal of the electrostatic source, and is not directly applied to the internal circuit A. Therefore, the internal circuit A is protected against the static electricity with respect to the power source of the internal circuit B as a reference, which is different from the power source connected to the internal circuit A.

Conversely, when static electricity of a positive charge is applied to any output terminal $OUT_j$ with respect to the power source terminal $V_{CCA}$ or the ground terminal $GND_A$ of the internal circuit A as a reference, the diode $D_{Bj1}$ is forward-biased in the conventional static electricity protection circuit $EC_{Bj}$. Accordingly, the output terminal $OUT_j$ is electrically connected to the static electricity protection circuit EG via the resistor $R_{Bj}$ and the diode $D_{Bj1}$, and thus a potential rise on the output terminal $OUT_j$ due to the applied positive charge, which is not absorbed in the static electricity protection circuit $EC_{Bj}$, is transmitted to the source S of the transistor $FET_G$ via the resistor $R_{V2}$. Thus, the potential on the source S of the transistor $FET_V$ rises, so that the depletion layer in the vicinity of the source region extends to the drain region of the transistor $FET_G$, and is connected to the depletion region in the vicinity of the drain region. That is, a current path due to the depletion region is established between the drain D and the source S of the transistor $FET_V$; namely, a punch through occurs, so that the transistor $FET_V$ is rendered conductive. As a result, a current path is established between the output terminal $OUT_j$ and the power source terminal $V_{CCA}$ by the resistor $R_{Bj}$ and diode $D_{Bj1}$ in the static electricity protection circuit $EC_{Bj}$, and by the resistor $R_{V2}$, the transistor $FET_V$ and the resistor $R_{V1}$ in the static electricity protection circuit EV. Therefore, the positive charge, applied to the output terminal $OUT_j$ with respect to the power source terminal $V_{CCA}$ or the ground terminal $GND_A$ as a reference, is not directly applied to the internal circuit B since the applied positive charge combines with a charge of the opposite polarity at the ground terminal $GND_A$ through the static electricity protection circuit EV and the current path $l_A$ in the internal circuit A, or at the power source terminal $V_{CCA}$ through the static electricity protection circuit EV.

Furthermore, where static electricity of a negative charge is applied to the output terminal $OUT_j$ with respect to the power source terminal $V_{CCA}$ or the ground terminal $GND_A$ of the internal circuit A as a reference, the diode $D_{Bj2}$ is forward-biased to be conductive in the conventional static electricity protection circuit $EC_{Bj}$. Accordingly, the output terminal $OUT_j$ is electrically connected to the static electricity protection circuit EG via the resistor $R_{Bj}$ and the diode $D_{Bj2}$. Therefore, a potential fall on the output terminal $OUT_j$ due to the applied negative charge, which is not absorbed in the static electricity protection circuit $EC_{Bj}$, is transmitted to the source S of the transistor $FET_G$ via the resistor $R_{G2}$, resulting in a potential fall on the source S of the transistor $FET_G$. This potential fall causes a voltage between the gate G and the source S of the transistor $FET_G$ to exceed the threshold voltage $V_{TH}$ and thus renders the transistor $FET_G$ conductive. As a result, a current path is established between the output terminal $OUT_j$ and the ground terminal $GND_B$ by the resistor $R_{G1}$, the transistor $FET_G$ and the resistor $R_{G2}$ in the static electricity protection circuit EG and by the diode $D_{Bj2}$ and the resistor $R_{Bj}$ in the static electricity protection circuit $EC_{Bj}$. Thus, the negative charge, applied to the output terminal $OUT_j$ with respect to the power source terminal $V_{CCA}$ or the ground terminal $GND_A$ as a reference, also combines with a charge of the opposite polarity at the power source terminal $V_{CCA}$ through the static electricity protection circuit EG and the current path $l_A$ in the internal circuit A, or at the ground terminal $GND_A$ through the static electricity protection circuit EG.

As described above, in the case that the static electricity is applied to the output terminal $OUT_j$ of the internal circuit B with respect to the power source of the internal circuit A as a reference, unlikely to the conventional, the output terminal $OUT_j$ is electrically connected to the power source of the internal circuit A via the static electricity protection circuit EV or EG. Accordingly, the static electricity applied to the output terminal $OUT_j$ is removed at the ground terminal $GND_A$ or the power source terminal $V_{CCA}$, which is the reference potential terminal of the electrostatic source, so that the static electricity is not directly applied to the internal circuit B. Therefore, the internal circuit B is protected against the static electricity with respect to the power source of the internal circuit A as a reference, which is different from the power source connected to the internal circuit B.

As mentioned above, the static electricity protection circuit EV or EG can protect both the internal circuits A and B of the LSI 1 against the static electricity with respect to the power sources as references, different from those connected to these internal circuits.

As has been described, in this embodiment, the static electricity, applied to the input terminal of the internal circuit A and to the output terminal of the internal circuit B with respect to the respective power sources of the internal circuits A and B, is absorbed in the conventional static electricity protection circuit $EC_{Ai}$ or $EC_{Bj}$, while the static electricity, applied to the input terminal of the internal circuit A and to the output terminal of internal circuit B with respect to the respective power sources of the internal circuits B and A, are absorbed in the new static electricity protection circuit EV or EG.

In the above described embodiment, the LSI includes two internal circuits respectively connected to the two power sources. However, this embodiment is also applicable to an LSI including internal circuits respectively connected to three or more of the power sources. That is, in the case of the LSI connected to three or more of the power sources, a provision of the described static electricity protection circuits EV and EG for each combination of two power sources allows all the internal circuits to be protected against static electricity to be applied with respect to any of the power sources as a reference.

As a matter of course, resistance values of the resistors $R_{Ai}$, $R_{Bj}$ and $R_{V1}$-$R_{V3}$ and ON resistance values of the transistors $FET_V$ and $FET_G$ and of the diodes $D_{Ai1}$, $D_{Ai2}$, $D_{Bj1}$ and $D_{Bj2}$, in this embodiment, need to be set so that immediately after application of static electricity, a voltage of the connecting point of the two diodes in the conventional static electricity protection circuit, provided corresponding to the input/output terminal supplied with a static electricity, may not exceed breakdown voltages of the elements constituting the current paths $l_A$ and $l_B$ in the internal circuits A and B, such as gate oxide film breakdown voltages or PN junction breakdown voltages of transistors; namely, the voltage of the connecting point may be lower than or equal to about 10 V. In general, the MIL (Military Standard) is employed for evaluation of anti-electrostatic properties of the LSI. Thus, an example of setting the resistance values of the described elements will be illustrated as follows, assuming the state of application of static electricity, simulated in accordance with the MIL. The evaluation of the anti-electrostatic properties of the LSI in accordance with the MIL is performed by applying a voltage of several hundreds to several thousands V to a capacitor of a 100 pF capacitance to store a charge therein and thus by applying the stored charge to the LSI via a resistor of 1.5 kΩ.

Figure 7:
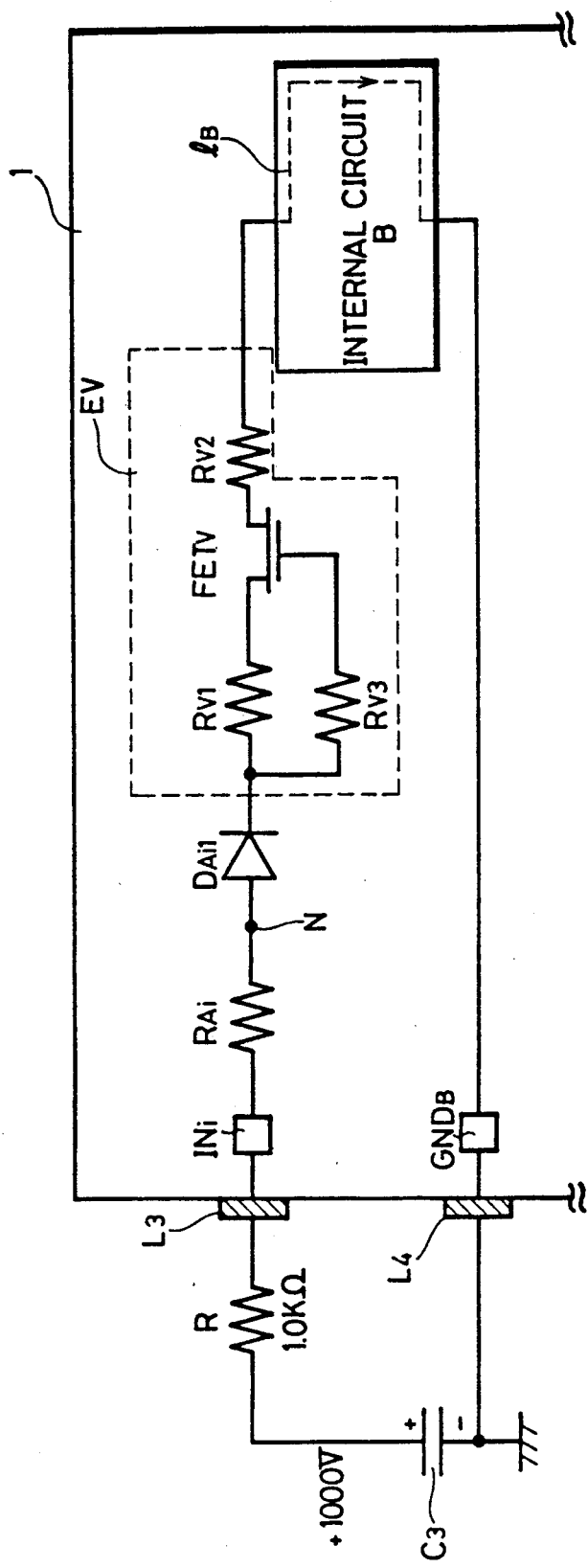
FIG. 7 is a circuit diagram illustrating one example of a current path established in the case that static electricity is applied to the integrated circuit apparatus illustrated in FIG. 6 according to the Military Standard (MIL).

FIG. 7 is a circuit diagram illustrating a current path established in the LSI 1 to remove a positive charge, which is applied to any input terminal $IN_i$ of the internal circuit A with respect to the ground terminal $GND_B$ as a reference in FIG. 6, the phenomenon of which is simulated in accordance with the MIL.

Referring to FIG. 7, in the case of simulation of the above phenomenon in accordance with the MIL, a capacitor C3 of 100 pF charged at 1,000 V, for example, and a resistor R of 1.5 kΩ are connected between a lead L3 provided in the LSI 1 to be connected to the input terminal $IN_i$ of the internal circuit A and a lead L4 provided in the LSI 1 to be connected to the ground terminal $GND_B$. In this case, a positive charge applied to the input terminal $IN_i$ via the resistor R flows from the input terminal $IN_i$ into the ground terminal $GND_B$ through the resistor $R_{Ai}$ and the diode $D_{Ai}$ of the conventional static electricity protection circuit $EC_{Ai}$ connected to the input terminal $IN_i$ and through the static electricity protection circuit EV and the current path $l_B$ in the internal circuit B so that the applied positive charge combines with a negative charge of the ground electrode side of the capacitor C3.

It is now assumed that the respective resistance values of the resistors $R_{Ai}$, $R_{V1}$ and $R_{V2}$ are 1 kΩ, 5Ω and 5Ω, the ON resistance values of the diode $D_{Ai1}$ and the transistor $FET_V$ are both 5Ω, and the resistance value of the current path $l_B$ in the internal circuit B is 5Ω. Where the capacitor C3 is charged at 1,000 V, and thus a potential on the connecting point of the capacitor C and the resistor R is 1,000 V, a potential on a connecting point N of the resistor $R_{Ai}$ and the diode $D_{Ai}$ attains about 10 V. Meanwhile, a potential on the gate of the transistor $FET_V$ and an internal potential of the internal circuit B are lower than the potential on the connecting point N. Therefore, if the resistance values of the resistors $R_{Ai}$, $R_{V1}$ and $R_{V2}$ and those of the $FET_V$ and the diode $D_{Ai1}$ are set at the above values, for example, at least a gate oxide film breakdown or an PN junction breakdown does not occur through the current path $l_B$ in the internal circuit B even if the positive charge of 1,000 V is applied to the input terminal $IN_i$ with respect to the ground terminal $GND_B$ as a reference. Immediately after application of static electricity, i.e., when a current path is not established from the input terminal $IN_i$ to the ground terminal $GND_B$, the potential 1,000 V on the connecting point of the capacitor C3 and the resistor R allows a gate potential of the transistor $FET_V$ to instantaneously rise to about the same potential level as 1000 V, so that the transistor $FET_V$ is sufficiently rendered conductive.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An integrated circuit apparatus comprising:
    at least first and second internal circuits respectively driven by at least first and second power sources;
    a plurality of input terminals provided for said first internal circuit;
    a plurality of output terminals provided for said second internal circuit in correspondence to said plurality of input terminals;
    first static electricity removing means provided between said plurality of input terminals and said first power source for electrically connecting each of said plurality of input terminals, which are supplied with static electricity with respect to said first power source as a reference, to said first power source for removing the applied static electricity;
    second static electricity removing means provided between said plurality of output terminals and said second power source for electrically connecting each of said plurality of output terminals, which are supplied with static electricity with respect to said second power source as a reference, to said second power source for removing the applied static electricity; and
    third static electricity removing means comprising MOS transistors provided between said first power source and said second power source, and when static electricity is applied to one of said plurality of input terminals with respect to said second power source as a reference or when static electricity is applied to one of said plurality of output terminals with respect to said first power source as a reference, said first power source and said second power source are electrically connected to remove the applied static electricity.

2. An integrated circuit apparatus according to claim 1, wherein
    said third static electricity removing means comprises
    a first static electricity removing path provided between a higher potential side of said first power source and a higher potential side of said second power source, and when positive static electricity is applied to one of said plurality of input terminals with respect to said first power source as a reference, the higher potential side of said first power source and the higher potential side of said second power source are electrically connected to remove said applied positive static electricity, and
    a second static electricity removing path provided between a lower potential side of said first power source and a lower potential side of said second power source, and when negative static electricity is applied to one of said plurality of input terminals with respect to said second power source as a reference or when negative static electricity is applied to one of said plurality of output terminals with respect to said first power source as a reference, the lower potential side of said first power source and the lower potential side of said second power source to remove the applied negative static electricity.

3. An integrated circuit apparatus according to claim 2, wherein
said first static electricity removing means comprises
first and second diode means provided for each of said plurality of input terminals and connected, to be reverse-biased, respectively between said plurality of input terminals and the higher potential side and the lower potential side of said first power source; and
said second static electricity removing means comprises
third and fourth diode means provide for each of said plurality of output terminals and connected, to be reverse-biased, respectively between said plurality of output terminals and the higher potential side and the lower potential side of said second power source.

4. An integrated circuit apparatus according to claim 2, wherein
said first static electricity removing path comprises a first MOSFET including a control terminal and a first conduction terminal, connected to the higher potential side of said first power source, and a second conduction terminal connected to the higher potential side of said second power source; and
said second static electricity removing path comprises
a second MOSFET including a control terminal and a second conduction terminal, connected to the lower potential side of said first power source, and a second conduction terminal connected to the lower potential side of said second power source.

5. An integrated circuit apparatus according to claim 4, wherein
said first and second MOSFETs each comprise an enhancement type N channel MOS transistor.

6. An integrated circuit apparatus according to claim 4, wherein
said first and second MOSFETs each comprise an enhancement type P channel MOS transistor.

7. An integrated circuit apparatus comprising:
first and second internal circuits provided respectively for corresponding first and second power sources;
a first higher potential side terminal and a first lower potential side terminal for connecting said first power source to said first internal circuit;
a second higher potential side terminal and a second lower potential side terminal for connecting said second power source to said second internal circuit;
a plurality of input terminals connected to said first internal circuit for receiving an input signal to said first internal circuit;
a plurality of output terminals connected to said second internal circuit for receiving an output signal from said second internal circuit in correspondence to said plurality of input terminals;
a plurality of first diodes connected between each of said plurality of input terminals and said first higher potential side terminal;
a plurality of second diodes connected between each of said plurality of input terminals and said first lower potential side terminal;
a plurality of third diodes connected between each of said plurality of output terminals and said second higher potential side terminal;
a plurality of fourth diodes connected between each of said plurality of output terminals and said second lower potential side terminal;
a first N channel MOS transistor having a gate and a drain connected to said first higher potential side terminal and a source connected to said second higher potential side terminal; and
a second N channel MOS transistor having a gate and a drain connected to said first lower potential side terminal and a source connected to said second lower potential side terminal,
said first and second N channel MOS transistors being enhancement type transistors,
said first lower potential side terminal being coupled to a ground potential of said first power source, and
said second lower potential side terminal being coupled to a ground potential of said second power source.

8. An integrated circuit apparatus according to claim 1, wherein the potential on a higher potential side of said first power source is different than the potential on a higher potential side of said second power source and the potential on a lower potential side of said first power source is different than the potential on a lower potential side of said second power source.

9. An integrated circuit apparatus according to claim 7, further comprising:
a first static electricity removing path provided between said first higher potential side terminal and said second higher potential side terminal, and when positive static electricity is applied to only one of said plurality of input terminals with respect to said second power source as a reference or when positive static electricity is applied to one of said plurality of output terminals with respect to said first power source as a reference, said first higher potential side and said second higher potential side are electrically connected to remove said applied positive static electricity; and
a second static electricity removing path provided between said first lower potential side terminal and said second higher potential side terminal, and when negative static electricity is applied to one of said plurality of input terminals with respect to said second power source as a reference or when negative static electricity is applied to one of said plurality of output terminals with respect to said first power source as a reference, said first lower potential side terminal and said second lower potential side terminal are electrically connected to remove the applied negative static electricity.

10. An integrated circuit apparatus according to claim 9, wherein each of said plurality of first diodes and each corresponding one of said plurality of second diodes are connected to be reverse-biased between said plurality of input terminals and said first higher and lower potential side terminals and each of said plurality of third diodes and each corresponding one of said plurality of fourth diodes are connected to be reverse-biased between said plurality of output terminals and said second higher and lower potential side terminals.

11. An integrated circuit apparatus according to claim 7, wherein the potential on said first higher potential side terminal is different than the potential on said second higher potential side terminal and the potential on said first lower potential side terminal is different than the potential on said second lower potential side terminal.

* * * * *